United States Patent
Kuscher et al.

(10) Patent No.: US 9,983,632 B2
(45) Date of Patent: May 29, 2018

(54) COVER TO PROTECT KEYBOARD AND BOTTOM OF LAPTOP COMPUTER

(71) Applicant: Google Inc., Mountain View, CA (US)

(72) Inventors: Alexander Friedrich Kuscher, San Francisco, CA (US); Katie Leah Roberts-Hoffman, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/001,552

(22) Filed: Jan. 20, 2016

(65) Prior Publication Data
US 2017/0102740 A1   Apr. 13, 2017

Related U.S. Application Data

(60) Provisional application No. 62/240,437, filed on Oct. 12, 2015.

(51) Int. Cl.
*G06F 1/16* (2006.01)

(52) U.S. Cl.
CPC ............ *G06F 1/1662* (2013.01); *G06F 1/162* (2013.01); *G06F 1/1616* (2013.01); *G06F 1/1618* (2013.01); *G06F 1/1681* (2013.01)

(58) Field of Classification Search
CPC ....... G06F 1/1616; G06F 1/1618; G06F 1/162
See application file for complete search history.

(56) References Cited

U.S. PATENT DOCUMENTS

| | | | | |
|---|---|---|---|---|
| 5,607,054 A | * | 3/1997 | Hollingsworth | G06F 1/1628 206/305 |
| 5,796,575 A | * | 8/1998 | Podwalny | G06F 1/1626 361/679.27 |
| 5,987,704 A | | 11/1999 | Tang | |
| 6,256,192 B1 | * | 7/2001 | Shannon | G06F 1/1616 312/223.2 |
| 6,341,061 B1 | * | 1/2002 | Eisbach | G06F 1/1616 312/223.2 |
| 6,351,372 B1 | * | 2/2002 | Kim | G06F 1/1616 312/208.4 |

(Continued)

OTHER PUBLICATIONS

"Magnetic covers over keyboards for laptop convertibles?", Notebook Review, retrieved on Oct. 7, 2015 from http://forum.notebookreview.com/threads/magnetic-covers-over-keyboards-for-laptop-convertibles.772094/, 4 pages.

(Continued)

*Primary Examiner* — Adrian S Wilson
(74) *Attorney, Agent, or Firm* — Brake Hughes Bellermann LLP

(57) ABSTRACT

A laptop computer may include a base, a lid, and a cover. The base may include a keyboard on a first side of the base. The lid may be hingedly attached to a first end of the base. The lid may include a display on a first side of the lid. The hinged attachment of the lid to the base may enable the lid to rotate from a first lid position in which the display faces the keyboard, to a second lid position in which a second side of the lid faces a second side of the base. A hinged attachment of the cover to the base may enable the cover to rotate from a first cover position, in which a first side of the cover faces the keyboard, to a second cover position in which a second side of the cover faces the second side of the base.

15 Claims, 11 Drawing Sheets

(56) References Cited

U.S. PATENT DOCUMENTS

| | | | | |
|---|---|---|---|---|
| 6,353,529 | B1* | 3/2002 | Cies | G06F 1/1616 248/917 |
| 6,421,235 | B2* | 7/2002 | Ditzik | G06F 1/1616 320/114 |
| 6,667,878 | B2 | 12/2003 | Ponx et al. | |
| 6,870,732 | B2* | 3/2005 | Huang | G06F 1/1626 220/230 |
| 7,136,282 | B1* | 11/2006 | Rebeske | G06F 1/1616 345/1.1 |
| 7,327,560 | B1* | 2/2008 | Tabasso | G06F 1/3203 248/917 |
| 7,821,780 | B2* | 10/2010 | Choy | G06F 1/1616 165/80.4 |
| 8,264,310 | B2* | 9/2012 | Lauder | G06F 1/1613 206/320 |
| 8,289,115 | B2* | 10/2012 | Cretella, Jr. | G06F 1/1626 206/320 |
| 8,295,037 | B1* | 10/2012 | Buuck | G06F 1/1616 361/679.01 |
| 8,467,186 | B2* | 6/2013 | Zeliff | G06F 1/1628 345/168 |
| 8,537,531 | B2* | 9/2013 | Gotham | H05K 5/02 345/175 |
| 8,624,844 | B2* | 1/2014 | Behar | G06F 1/162 345/168 |
| 8,720,843 | B1* | 5/2014 | Chen | G06F 1/1613 206/305 |
| 8,724,300 | B2* | 5/2014 | Smith | G06F 1/1628 206/320 |
| 8,803,816 | B2* | 8/2014 | Kilpatrick, II | G06F 1/1616 345/173 |
| 8,934,229 | B2* | 1/2015 | Thorson | G06F 1/1618 248/917 |
| 9,161,469 | B2* | 10/2015 | Han | H05K 7/00 |
| 2002/0141146 | A1* | 10/2002 | Mustoe | G06F 1/1616 361/679.04 |
| 2002/0154099 | A1* | 10/2002 | Oh | G06F 1/1626 345/173 |
| 2003/0142469 | A1* | 7/2003 | Ponx | G06F 1/1616 361/679.04 |
| 2004/0160736 | A1* | 8/2004 | Lin | G06F 1/1649 361/679.04 |
| 2005/0128695 | A1* | 6/2005 | Han | G06F 1/162 361/679.55 |
| 2005/0207102 | A1* | 9/2005 | Russo | G06F 1/1601 361/679.27 |
| 2005/0237269 | A1* | 10/2005 | Connor | G06F 1/1616 345/1.3 |
| 2006/0018089 | A1* | 1/2006 | Chou | G06F 1/1626 361/679.09 |
| 2006/0226040 | A1* | 10/2006 | Medina | G06F 1/1616 206/320 |
| 2007/0103266 | A1* | 5/2007 | Wang | G06F 1/1632 335/285 |
| 2007/0176902 | A1* | 8/2007 | Newman | G06F 1/1626 345/168 |
| 2008/0062625 | A1* | 3/2008 | Batio | G06F 1/1615 361/679.29 |
| 2008/0096620 | A1* | 4/2008 | Lee | G06F 1/1626 455/575.8 |
| 2010/0064536 | A1* | 3/2010 | Caskey | G06F 1/1616 33/303 |
| 2010/0110629 | A1* | 5/2010 | Dietz | A45C 11/00 361/679.55 |
| 2010/0128428 | A1 | 5/2010 | Yu et al. | |
| 2010/0164836 | A1* | 7/2010 | Liberatore | G06F 1/1616 345/1.1 |
| 2011/0002096 | A1* | 1/2011 | Thorson | G06F 1/1618 361/679.04 |
| 2011/0216415 | A1 | 9/2011 | Engblom et al. | |
| 2012/0044638 | A1* | 2/2012 | Mongan | A45C 11/00 361/679.55 |
| 2012/0194448 | A1* | 8/2012 | Rothkopf | A45C 13/002 345/173 |
| 2013/0031289 | A1* | 1/2013 | Yeh | G06F 1/1632 710/303 |
| 2013/0033806 | A1* | 2/2013 | Rochna | G06F 1/1628 361/679.01 |
| 2014/0151248 | A1* | 6/2014 | Hurst | A45C 13/1069 206/45.23 |
| 2014/0254077 | A1 | 9/2014 | Griffin | |
| 2016/0087670 | A1* | 3/2016 | Lee | H04M 1/0202 455/575.8 |
| 2016/0170448 | A1* | 6/2016 | Michino | G06F 1/1616 361/679.06 |

OTHER PUBLICATIONS

"Monitor Filter", from Wikipedia, the free encyclopedia, retrieved on Dec. 16, 2015 from https://en.wikipedia.org/wiki/Monitor_filter, 1 page.

International Search Report and Written Opinion for PCT Patent Application No. PCT/US2016/056415, dated Jan. 17, 2017, 16 pages.

* cited by examiner

COVER TO PROTECT KEYBOARD AND BOTTOM OF LAPTOP COMPUTER

PRIORITY CLAIM

This Application claims the benefit of priority to U.S. Provisional Application No. 62/240,437, filed on Oct. 12, 2015, entitled, "Cover to Protect Keyboard and Bottom of Laptop Computer," the disclosure of which is hereby incorporated by reference.

TECHNICAL FIELD

This description relates to laptop computers.

BACKGROUND

Some laptop computers can rotate to a "tablet" position in which the base is adjacent to the lid, and the display, which is a component of the lid, is exposed to face the user. In this position, the human input devices, such as the keyboard and trackpad, are also exposed on an opposite side of the lid from the display, and may receive accidental input from the user while the user is holding the laptop computer in the tablet position.

SUMMARY

According to one example, laptop computer may include a base, a lid, and a cover. The base may include a keyboard on a first side of the base. The lid may be hingedly attached to a first end of the base. The lid may include a display on a first side of the lid. The hinged attachment of the lid to the base may enable the lid to rotate from a first lid position in which the display faces the keyboard to a second lid position in which a second side of the lid, faces a second side of the base. The second side of the lid may be opposite from the first side of the lid. The second side of the base may be opposite from the first side of the base. The cover may be hingedly attached to a second end of the base. The second side of the base may be opposite from the first end of the base. The hinged attachment of the cover to the base may enable the cover to rotate from a first cover position, in which a first side of the cover faces the keyboard, to a second cover position in which a second side of the cover, opposite from the first side of the cover, faces the second side of the base.

According to another example, a laptop computer may include a base, a lid, and a cover. The base may include a keyboard on a first side of the base. The lid may be hingedly attached to the base at a first end of the lid. The lid may comprise a display on a first side of the lid. The hinged attachment of the lid to the base may enable the lid to rotate from a first lid position, in which the display faces the keyboard, to a second lid position in which a second side of the lid, opposite from the first side of the lid, faces a second side of the base. The second side of the base may be opposite from the first side of the base. The cover may be hingedly attached to a second end of the lid. The second end of the lid may be opposite from the first end of the lid. The hinged attachment of the cover to the lid may enable the cover to rotate from a first cover position in which a first side of the cover covers the display when the lid is in the first lid position, to a second cover position in which a second side of the cover, opposite from the first side of the cover, covers the keyboard.

A laptop computer may include a base and a lid. The base may include a keyboard on a first side of the base, a first base magnet configured to secure a cover to the first side of the base, and a second base magnet configured to secure the cover to a second side of the base. The second side of the base may be opposite from the first side of the base. The lid may be hingedly attached to the base at a first end of the lid. The lid may include a display on a first side of the lid. The hinged attachment of the lid to the base may enable the lid to rotate from a first lid position in which the display faces the keyboard to a second lid position in which a second side of the lid, opposite from the first side of the lid, faces a second side of the base. The second side of the base may be opposite from the first side of the base.

The details of one or more implementations are set forth in the accompanying drawings and the description below. Other features will be apparent from the description and drawings, and from the claims.

DETAILED DESCRIPTION

Figure 1:
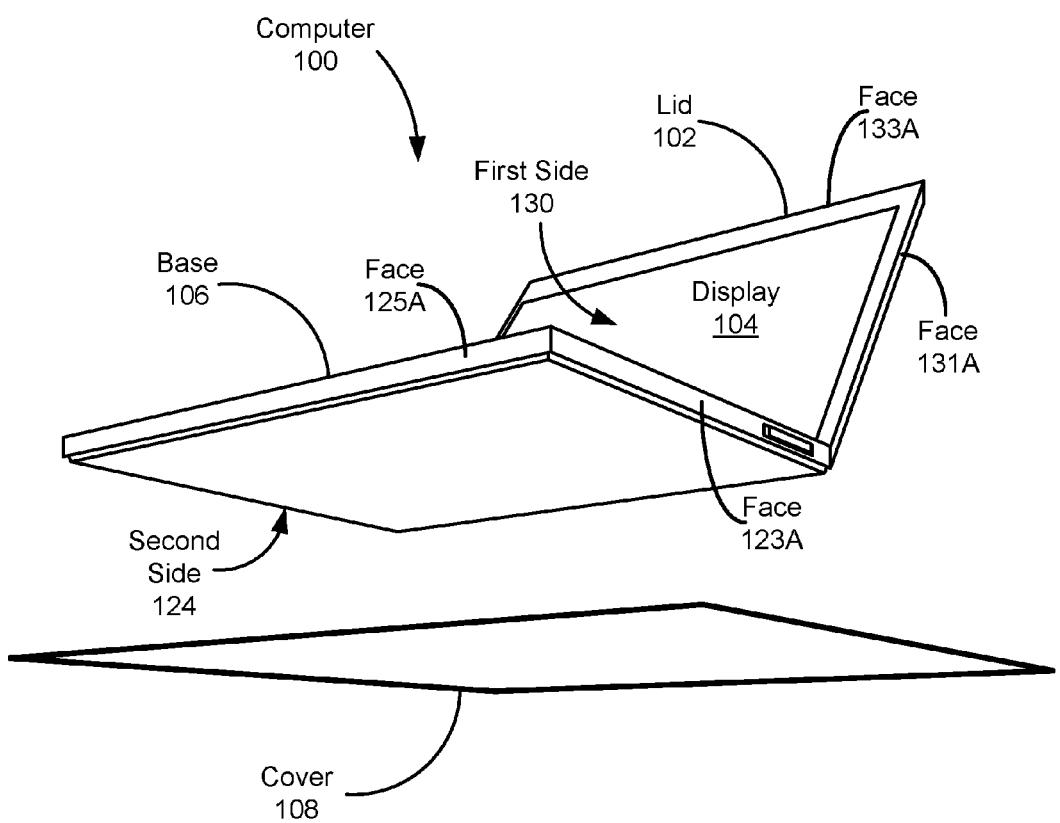
FIG. 1 is a perspective view of a laptop computer and a cover according to an example implementation.

FIG. 1 is a perspective view of a laptop computer 100 and a cover 108 according to an example implementation. The laptop computer 100, which may include a notebook computer and/or a convertible computer, may have a three hundred sixty degree (360°) rotatable hinge. The hinge may attach a base 106 of the laptop computer 100 to lid 102 of the laptop computer 100. The hinged attachment of the lid 102 to the base 106 may enable the lid 102 to rotate from a first lid position in which a first side 130, or screen, of the lid 102, faces a first side 122 (not shown in FIG. 1), or keyboard, of the base 106, to a second lid position in which a second side 132 (not shown in FIG. 1), or top, of the lid 102, faces a second side 124, or bottom, of the base 106. The second side 132 of the lid 102 may be opposite from the first side 130 of the lid, and the second side 124 of the base 106 may be opposite from the first side 122 of the base 106.

In an example implementation, faces 123A, 125A, as well as faces 123B, 125B on opposite sides of the base 106 from the faces 123, 125, which are not shown in FIG. 1, may extend from the first side 122 of the base 106 to the second side 124 of the base 106. The faces 123A, 123B, 125A, 125B may be generally perpendicular to, such as within three degrees (3°) of perpendicular to, both the first side 122 and second side 124 of the base 106. The faces 123A, 123B, 125A, 125B may also be flat, rather than curved or beveled.

The lid 102 may include a display 104. The display 104 may provide output to a user, such as visual output. In an example implementation, the display 104 may include a touchscreen, and may receive tactile input from the user.

In an example implementation, faces 131A, 133A, as well as faces 131B, 133B on opposite sides of the lid 102 from the faces 131A, 133A, which are not shown in FIG. 1, may extend from the first side 130 of the lid 102 to the second side 132 of the lid 102. The faces 131A, 131B, 133A, 133B may be generally perpendicular to, such as within three degrees (3°) of perpendicular to, both the first side 130 and second side 132 of the lid 102. The faces 131A, 131B, 133A, 133B may also be flat, rather than curved for beveled. The general perpendicularity of the faces 123A, 123B, 125A, 125B, 131A, 131B, 133A, 133B to the base 106 and lid 102, and the flatness of the faces 123A, 123B, 125A, 125B, 131A, 131B, 133A, 133B, may cause the faces 123A, 123A, 125A, 125B, 131A, 131B, 133A, 133B to be generally parallel to, such as within six degrees (6°) of, each other, when the laptop computer 100 is in either the first position in which the first side 130 of the lid 102 faces the first side 122 of the base 106 or the second position in which the second side 132 of the lid 102 faces the second side 124 of the base 106. The parallelism may cause the faces 123A, 123A, 125A, 125B, 131A, 131B, 133A, 133B to be continuous with each other, so that the computer 100 appears to be made of one piece when in either the first position or the second position, rather than appearing to be made of two pieces, namely the base 106 and the lid 102.

The cover 108 may attach to the base 106 to protect a keyboard 120 (not shown in FIG. 1), and/or to the lid 102. In an example implementation, the cover 108 may be made of a translucent and/or transparent material, so that if the cover 108 covers the display 104, the user can still see the output of the display 104. In an example implementation, the cover 108 may be made of a material that filters light from obtuse angles, allowing a person directly in front of the display 104 to see the contents of the display 104 but not allowing persons viewing the display 104 from an angle to see the contents of the display 104, allowing the cover 108 to serve as a privacy screen. In an example implementation, the cover 108 may include polycarbonate or acrylic plastic, which may be surrounded by fabric, to reduce electromagnetic interference. The polycarbonate may be surrounded by fabric to provide a comfortable feel to the user, and/or to prevent the cover 108 from scratching components of the lid 102 and/or base 106.

Figure 2:
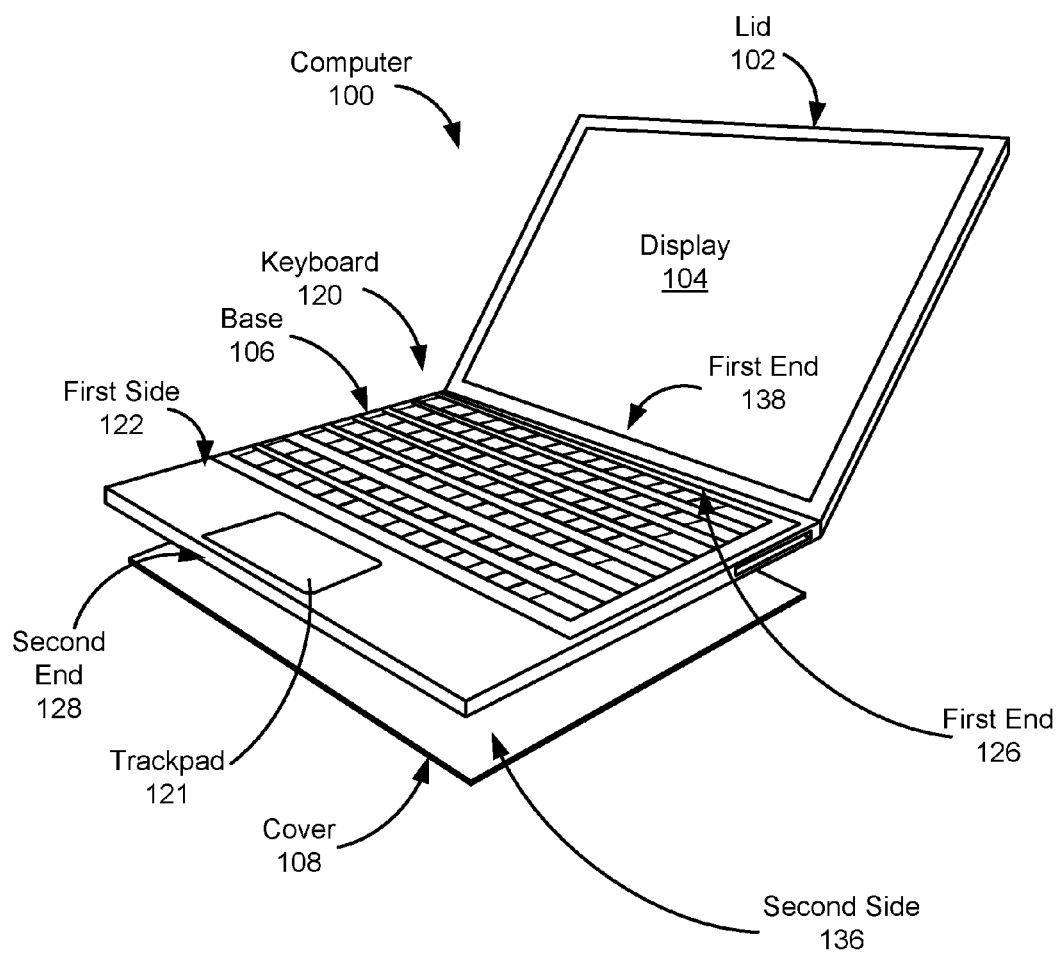
FIG. 2 is another perspective view of the laptop computer and the cover according to an example implementation.

FIG. 2 is another perspective view of the laptop computer 100 and the cover 108 according to an example implementation. As shown in FIG. 2, the first side 122 of the base 106 may include human interface devices such as a keyboard 120 for receiving alphanumeric input, and/or a trackpad 121 for receiving tactile input. In this example, the lid 102 is rotated to a third lid position, between the first lid position and the second lid position, in which the lid 102 is rotated to about one-hundred and thirty-five degrees (135°) away from the base 106, so that the user can view the display 104 and type into the keyboard 120.

Figure 3:
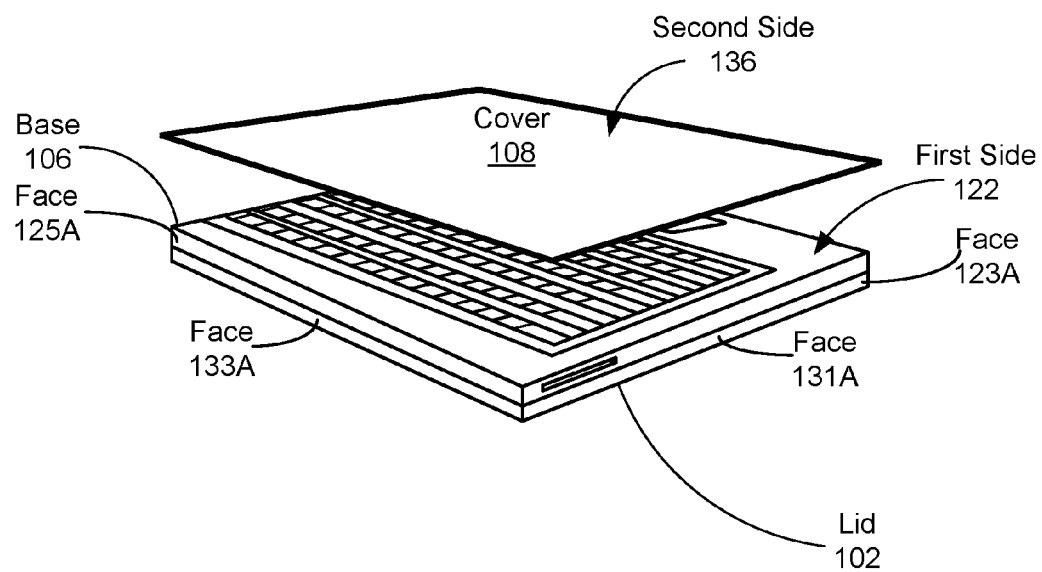
FIG. 3 is a perspective view of the laptop computer and the cover according to an example implementation in which a lid of the laptop computer has been rotated into a tablet position.

FIG. 3 is a perspective view of the laptop computer 100 and the cover 108 according to an example implementation in which a lid 102 of the laptop computer 100 has been rotated into a tablet position. The tablet position may be the second lid position, in which the second side 132 (not shown in FIG. 3) of the lid 102 faces the second side 124 (not shown in FIG. 3) of the base 106. In the tablet position, the user may hold and interact with the laptop computer 100 in a similar manner to a tablet computer, with the laptop computer 100 appearing and functioning as a single piece, with no rotating parts, and having a display 104 (not shown in FIG. 3) for the user to view and/or touch. FIG. 3 shows the cover 108 above the first side 122 of the base 106, and/or spaced away from the keyboard 120 (not labeled in FIG. 3). In this example, because the faces 123A, 123A, 125A, 125B, 131A, 131B, 133A, 133B are generally parallel to each other, the laptop computer 100 appears to be made of a single piece, appearing similar to a tablet computer.

Figure 4:
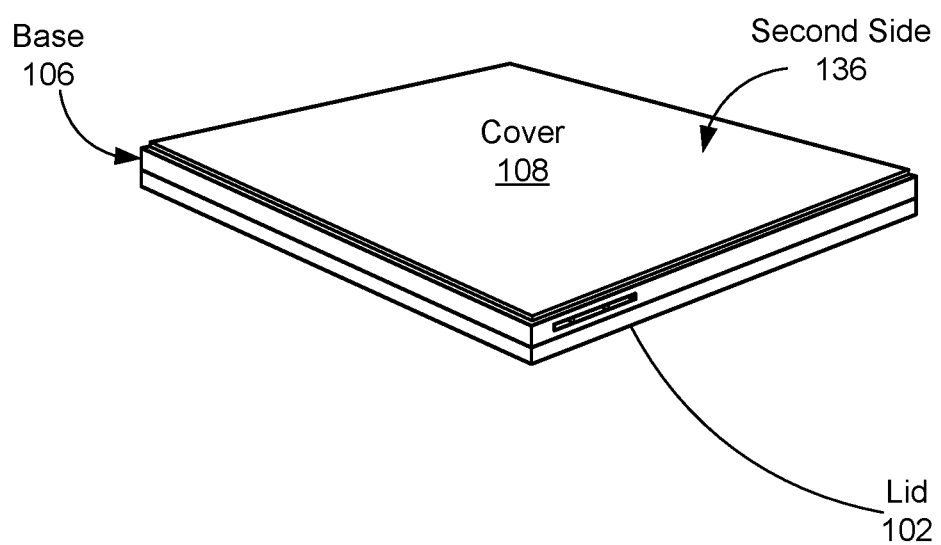
FIG. 4 is a perspective view of the laptop computer and the cover according to an example implementation in which a lid of the laptop computer has been rotated into a tablet position and the cover is covering a keyboard of the laptop computer.

FIG. 4 is a perspective view of the laptop computer 100 and the cover 108 according to an example implementation in which the lid 102 of the laptop computer 100 has been rotated into the tablet position and the cover 108 is covering the keyboard 120 (not shown in FIG. 4) of the laptop computer 100. In this example, the cover 108 is in contact with the first side 122 (not shown in FIG. 4) of the base 106, protecting the keyboard 120 and trackpad 121 (not shown in FIG. 4). The cover 108 may prevent accidental and/or inadvertent contacts with the keyboard 120 and/or trackpad 121. The prevention of accidental and/or inadvertent contacts with the keyboard 120 and/or trackpad 121 may prevent undesired input into the laptop computer 100. The prevention of accidental and/or inadvertent contacts with the keyboard 120 and/or trackpad 121 may also prevent the user from feeling that he or she has accidentally provided undesired input to the laptop computer 100, even if the keyboard 121 and/or trackpad 121 were disabled, and/or may avoid an uncomfortable feeling on the part of the user pushing the keys.

In an example implementation, the cover 108 may be secured to the first side 122 of the base 106 by magnets. The cover 108 may include at least one cover magnet, and may include multiple cover magnets, to secure the cover 108 to the first side 122 of the base 106 and/or to secure the cover 108 to the first side 130 of the lid 102. The base 106 may include at least one base magnet, and may include multiple base magnets, to mate with the at least one cover magnet to secure the cover 108 to the first side 122 of the base 106. The lid 102 may include at least one lid magnet, and may include multiple lid magnets, to secure the cover to the first side 130 of the lid 102.

Figure 5A:
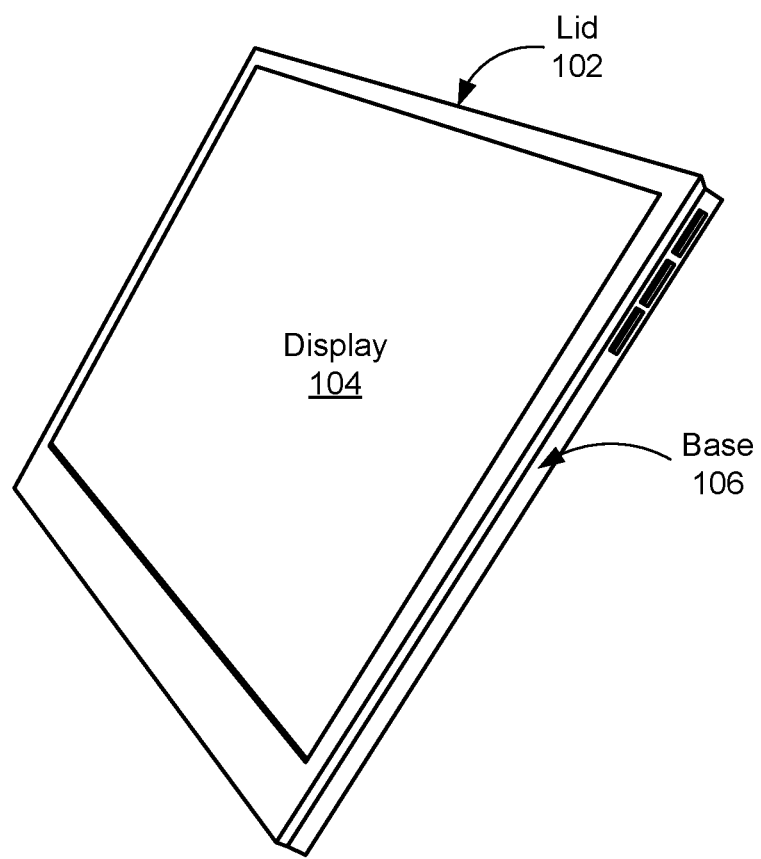
FIG. 5A is another perspective view of the laptop computer according to an example implementation in which a lid of the laptop computer has been rotated into a tablet position.

FIG. 5A is another perspective view of the laptop computer 100 according to an example implementation in which the lid 102 of the laptop computer 100 has been rotated into the tablet position, or second lid position. As shown in FIG. 5, in the tablet position and/or first lid position, the display 104 is presented to the user, and the laptop computer 100 appears and functions as a single piece, with no rotating parts.

Figure 5B:
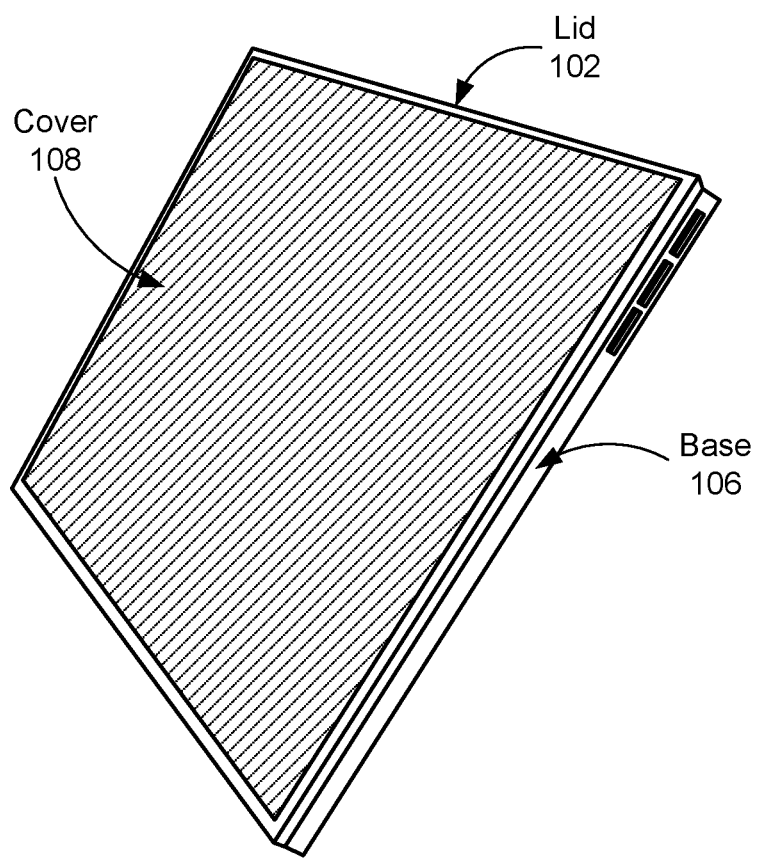
FIG. 5B is another perspective view of the laptop computer according to an example implementation in which a lid of the laptop computer has been rotated into a tablet position and a transparent cover extends over a display of the laptop computer.

FIG. 5B is another perspective view of the laptop computer 100 according to an example implementation in which the lid 102 of the laptop computer 100 has been rotated into a tablet position, or second lid position, and a transparent cover 108 extends over the display 104 of the laptop computer 100. In this example, the cover 108 may be made of a translucent and/or transparent material, that filters light from obtuse angles, allowing a person directly in front of the display 104 (not shown in FIG. 5B because it is covered by the cover 108) to see the contents of the display 104, but not allowing persons viewing the display 104 from an angle away from the user to see the contents of the display 104, so that the cover 108 may serve as a privacy screen. The cover 108 may be made of a plastic material in the millimeter range, thin enough to be transparent but thick enough to protect the display 104 and/or keyboard 120 and/or prevent keys on the keyboard 120 from being inadvertently depressed, such as between half a millimeter and a millimeter-and-a-half (between 0.5 millimeters and 1.5 millimeters).

Figure 6:
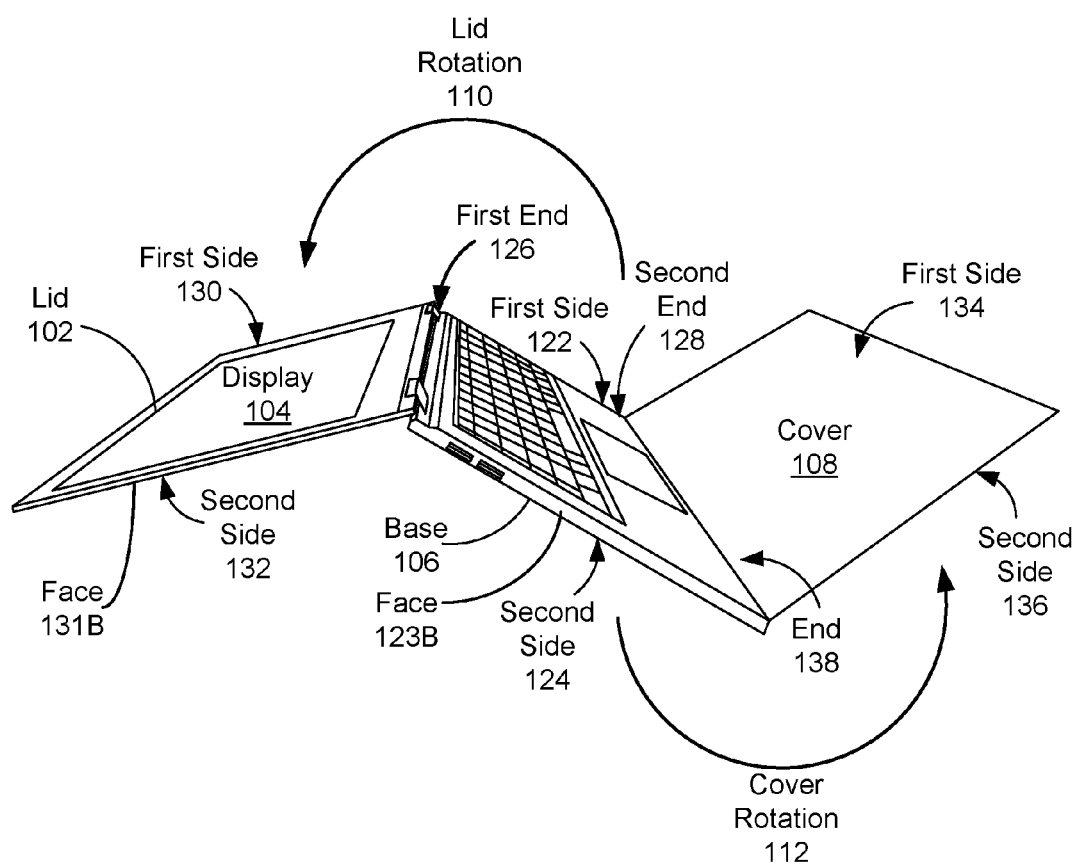
FIG. 6 is a perspective view of the laptop computer and cover in an example in which the cover is hingedly attached to a base of the laptop computer according to an example implementation.

FIG. 6 is a perspective view of the laptop computer 100 and cover 108 in an example in which the cover 108 is hingedly attached to a base 106 of the laptop computer 100 according to an example implementation. The lid 102 may be hingedly attached to the base 106 at a first end 126 of the base 106. In the example shown in FIG. 6, the lid 102 may rotate away from the base 106 in the direction shown by the lid rotation 110 arrow to be placed into the second lid position, and toward the base 106 in an opposite direction from that shown by the lid rotation 110 arrow to be placed into the first lid position.

The cover 108 may be hingedly attached to the base 106 at a second end 128 of the base 106. The second end 128 may be opposite from the first end 126. The hinged attachment of the cover 108 to the base 106 may enable the cover 108 to rotate from a first cover position to a second cover position. In the first cover position, a first side 134 of the cover 108 may face the keyboard 120 and/or first side 122 of the base 106. In the second cover position, a second side 136 of the cover 108 may face a second side 124 of the base 106. The second side 136 of the cover 108 may be opposite from the first side 134 of the cover 108.

In an example implementation, the hinged attachment of the cover 108 to the base 106 may include magnets. The cover 108 may include at least a first magnet at an end 138 of the cover 108, and may include multiple magnets at the end 138 of the cover 108. The second end 128 of the base 106 may include at least one magnet, and may include multiple magnets. The magnets at the end 138 of the cover 108 and the second end 128 of the base 106 may mate with each other to hingedly connect the cover 108 to the base 106.

Figure 7:
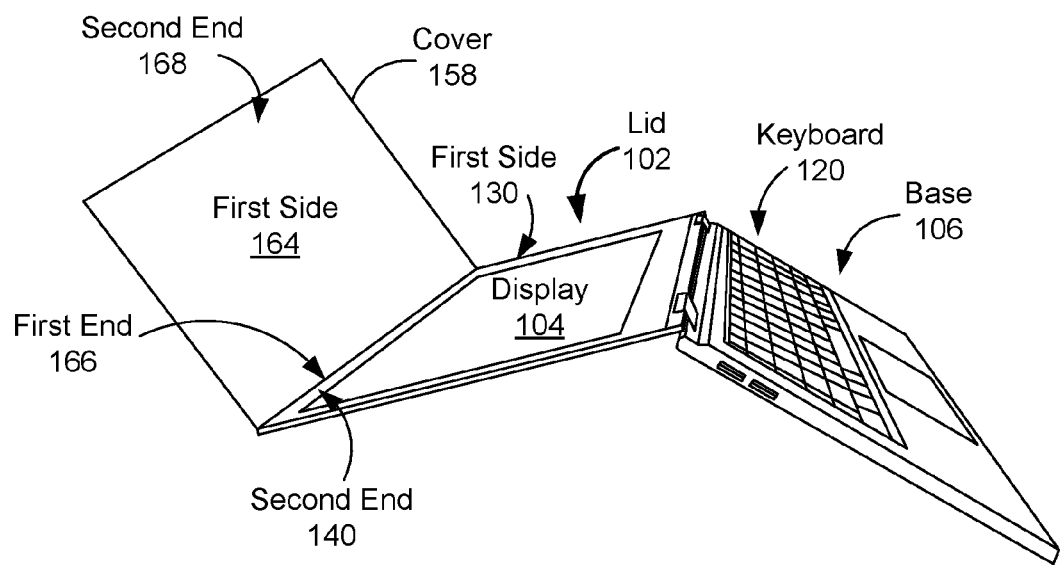
FIG. 7 is a perspective view of the laptop computer and cover in an example in which the cover is hingedly attached to a lid of the laptop computer according to an example implementation.

FIG. 7 is a perspective view of the laptop 100 computer and a cover 158 in an example in which the cover 158 is hingedly attached to the lid 102 of the laptop computer 100 according to an example implementation. In this example, the cover 158, which may have similar features and/or properties to the cover 108 described above, may be hingedly attached to a second end 140 of the lid 102. The second end 140 of the lid 102 may be hingedly attached to a first end 166 of the cover 158. The second end 140 may be opposite from an end of the lid 102 at which the lid 102 is hingedly attached to the base 106.

The hinged attachment of the cover 158 to the lid 102 may enable the cover 158 to rotate from a first cover position to a second cover position. In the first cover position, a first side 164 of the cover 158 may cover the display 104 when the lid 102 is in the first lid position. In the second cover position, a second side of the cover 158 may cover the keyboard 120. The second side of the cover 158 may be opposite from the first side 164 of the cover 158.

Figure 8:
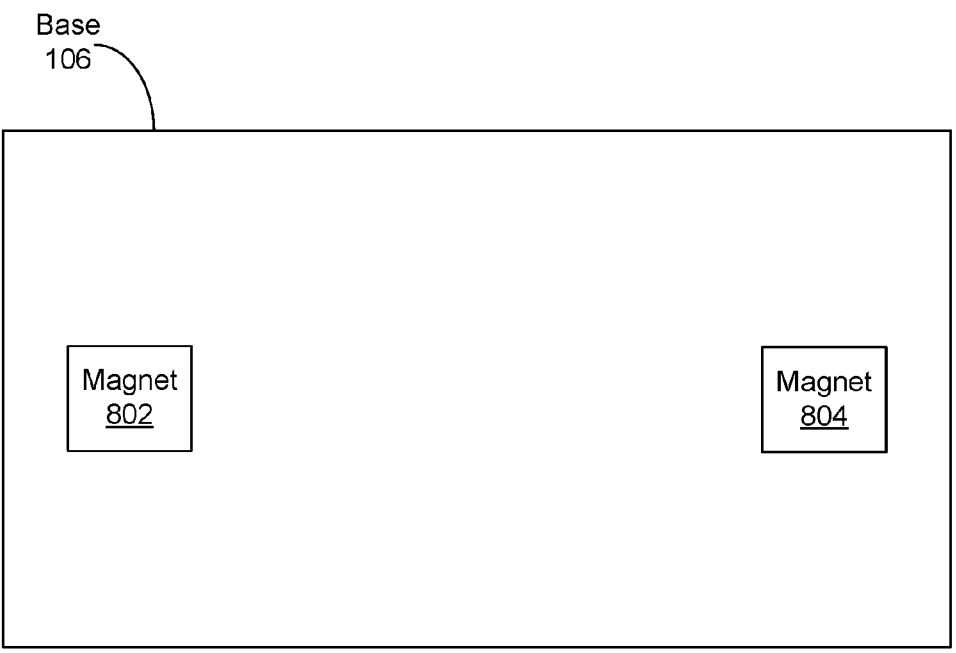
FIG. 8 is a schematic view of the base according to an example implementation.

FIG. 8 is a schematic view of the base 106 according to an example implementation. In this example, the base 106 may include at least one magnet 802, 804, and/or multiple magnets 802, 804. The magnets 802, 804 may be configured to mate with magnets 1002, 1004, 1102, 1104 of the cover 108, 158, to secure the cover 108, 158 to the first side 122 of the base 106.

Figure 9:
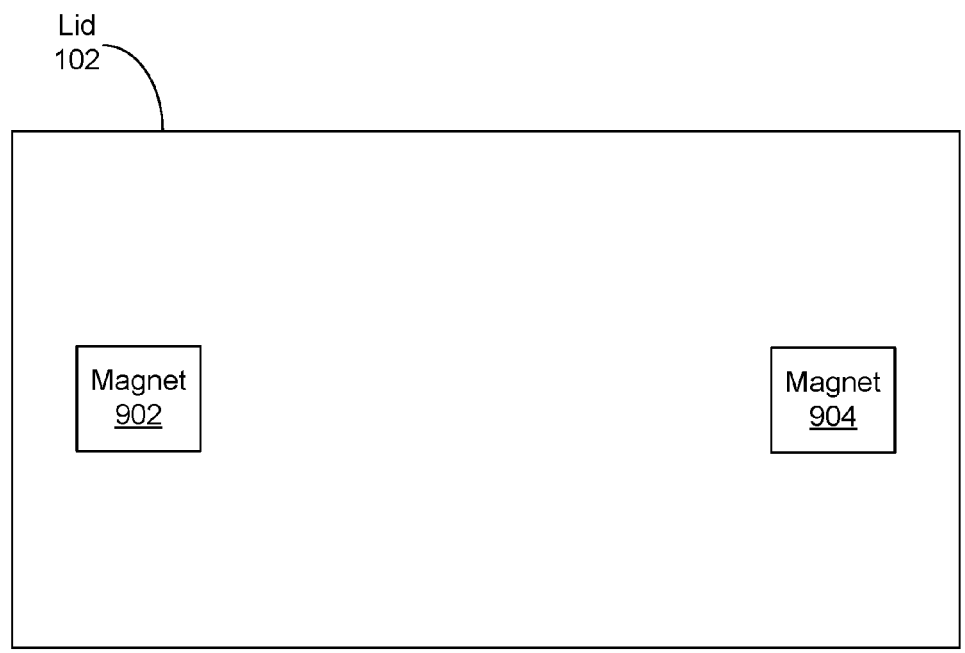
FIG. 9 is a schematic view of the lid according to an example implementation.

FIG. 9 is a schematic view of the lid 102 according to an example implementation. In this example, the lid 102 may include at least one magnet 902, 904, and/or multiple magnets 902, 904. The magnets 902, 904 may be configured to mate with magnets 1002, 1004, 1102, 1104 of the cover 108, 158, to secure the cover 108, 158 to the first side 130 of the lid 102.

Figure 10:
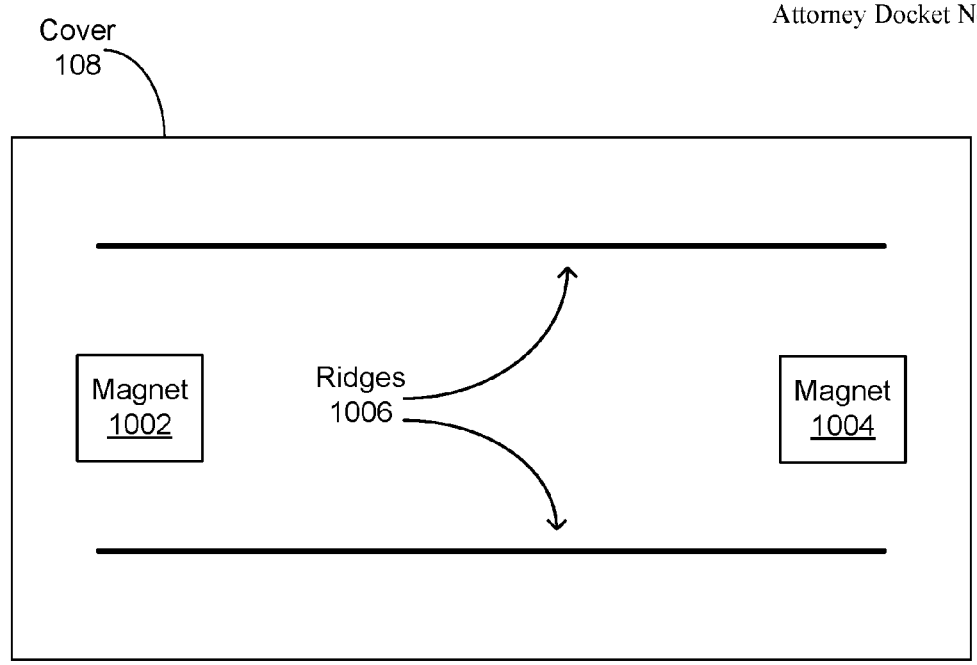
FIG. 10 is a schematic view of the cover that hingedly attaches to the base according to an example implementation.

FIG. 10 is a schematic view of the cover 108 that hingedly attaches to the base 106 (not shown in FIG. 10) according to an example implementation. In this example, the cover 108 may include at least one magnet 1002, 1004, and/or multiple magnets 1002, 1004. The magnets 1002, 1004 may mate with the magnets 802, 804 of the base 106 to secure the cover 108 to the first side 122 of the base 106, and/or may mate with the magnets 902, 904 to secure the cover 108 to the first side 130 of the lid 102.

The cover 108 may also include ridges 1006, risers, and/or standoffs on either or both sides 130, 132. The ridges 1006 may create a gap between the cover 108 and the base 106, preventing contact with the keyboard 120 and/or trackpad 121. The ridges 1006 may also create a gap between the cover 108 and a surface 150 (not shown in FIG. 10) on which the laptop computer 100 (not shown in FIG. 10) rests, preventing the laptop computer 100 and/or cover 108 from scratching the surface 150.

Figure 11:
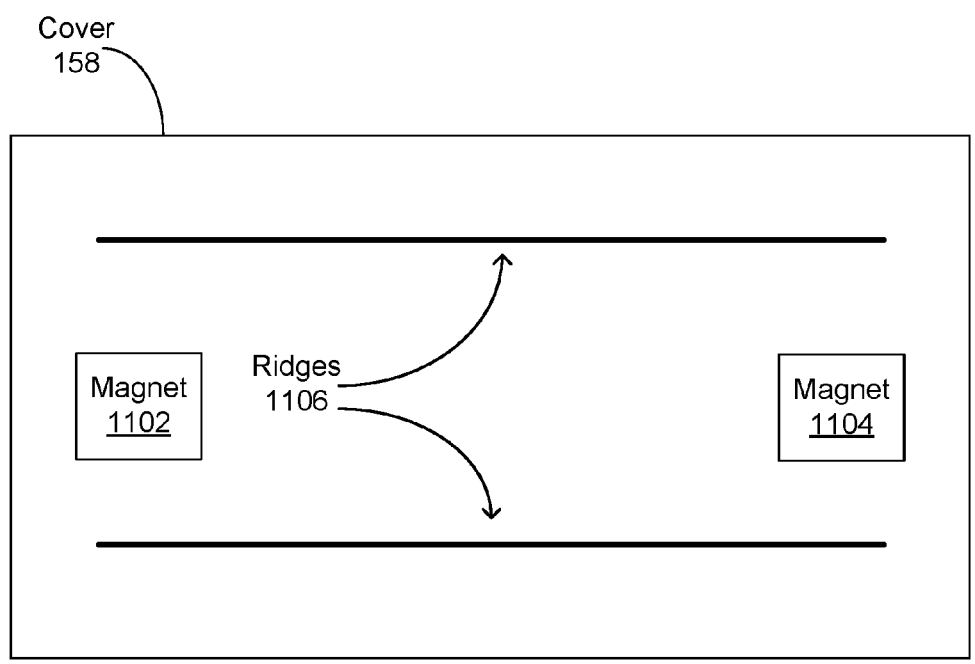
FIG. 11 is a schematic view of the cover that hingedly attaches to the lid according to an example implementation.

FIG. 11 is a schematic view of the cover 158 that hingedly attaches to the lid 102 (not shown in in FIG. 11) according to an example implementation. In this example, as in the example shown and described with respect to FIG. 10, the cover 158 may include at least one magnet 1102, 1104, and/or multiple magnets 1102, 1104. The magnets 1102, 1104 may mate with the magnets 802, 804 of the base 106 to secure the cover 158 to the first side 122 of the base 106, and/or may mate with the magnets 902, 904 to secure the cover 158 to the first side 130 of the lid 102.

The cover 158 may also include ridges 1106, risers, and/or standoffs on either or both sides 130, 132. The ridges 1106 may create a gap between the cover 108 and the base 106, preventing contact with the keyboard 120 and/or trackpad 121. The ridges 1106 may also create a gap between the cover 158 and a surface 150 (not shown in FIG. 11) on which the laptop computer 100 (not shown in FIG. 10) rests, preventing the laptop computer 100 and/or cover 158 from scratching the surface 150.

Figure 12:
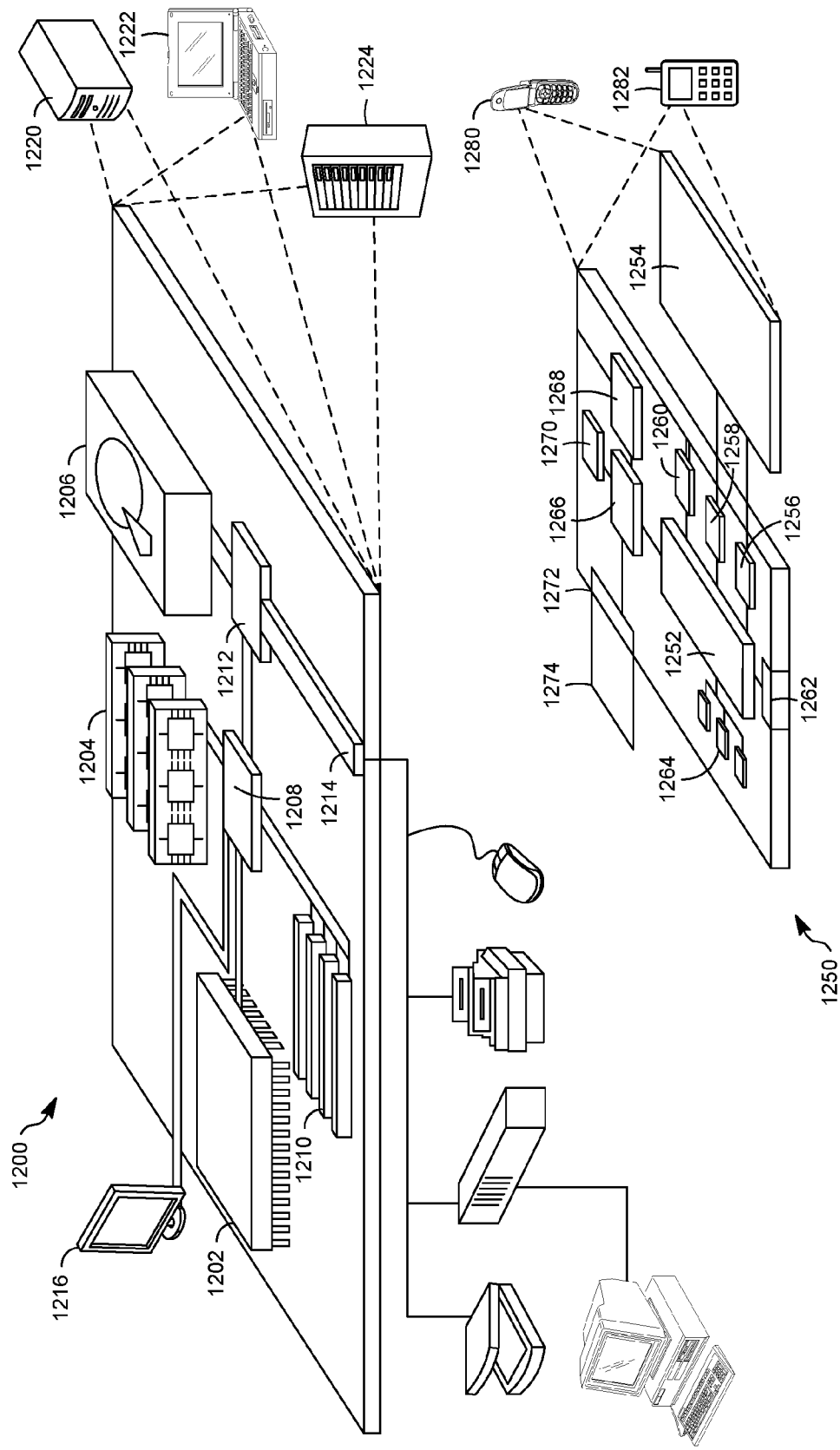
FIG. 12 shows an example of a generic computer device and a generic mobile computer device.

FIG. 12 shows an example of a generic computer device 1200 and a generic mobile computer device 1250. Computing device 1200 is intended to represent various forms of digital computers, such as laptops (including the laptop computer 100 described above), desktops, workstations, personal digital assistants, servers, blade servers, mainframes, and other appropriate computers. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device.

The computing system can include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. Any combination or subcombination, of some or all of the above-described features, and/or the below claims, may be included in various embodiments. It is, therefore, to be understood that the appended claims are intended to cover all such modifications and changes as fall within the true spirit of the embodiments of the invention.

What is claimed is:

1. A laptop computer comprising:
    a base comprising a keyboard on a first side of the base, the keyboard comprising depressible keys;
    a lid hingedly attached to a first end of the base, the lid comprising a display on a first side of the lid, the hinged attachment of the lid to the base enabling the lid to rotate from a first lid position in which the display faces the keyboard to a second lid position in which a second side of the lid, opposite from the first side of the lid, faces a second side of the base, the second side of the base being opposite from the first side of the base; and
    a cover hingedly attached to a second end of the base, opposite from the first end of the base, the cover being made of a single sheet of polycarbonate surrounded by fabric and having a thickness between half a millimeter and a millimeter-and-a-half, the hinged attachment of the cover to the base enabling the cover to rotate from a first cover position, in which a first side of the cover faces the keyboard, to a second cover position in which a second side of the cover, opposite from the first side of the cover, faces the second side of the base.

2. The laptop computer of claim 1, wherein the cover comprises at least one cover magnet configured to secure the cover in the first cover position and to secure the cover in the second cover position.

3. The laptop computer of claim 2, wherein:
    the base comprises at least one base magnet configured to secure the cover in the first cover position; and
    the lid comprises at least one lid magnet configured to secure the cover in the second cover position.

4. The laptop computer of claim 1, wherein the cover comprises ridges.

5. The laptop computer of claim 1, wherein the cover comprises a privacy screen.

6. The laptop computer of claim 1, wherein the hinged attachment of the cover to the base comprises at least a first magnet at an end portion of the cover and a second magnet at an end portion of the base, the end portion of the base being opposite from the hinged attachment of the lid to the base.

7. A laptop computer comprising:
    a base comprising:
        a keyboard on a first side of the base;
        a first base magnet configured to secure a cover to the first side of the base; and
        a second base magnet configured to secure the cover to a second side of the base, the second side of the base being opposite from the first side of the base;
    a lid hingedly attached to the base at a first end of the lid, the lid comprising a display on a first side of the lid, the hinged attachment of the lid to the base enabling the lid to rotate from a first lid position in which the display faces the keyboard to a second lid position in which a second side of the lid, opposite from the first side of the lid, faces a second side of the base, opposite from the first side of the base; and
    the cover secured to the first side of the base, the cover comprising a single sheet of polycarbonate surrounded by fabric.

8. The laptop computer of claim 7, wherein the cover comprises at least one cover magnet configured to:
    mate with the first base magnet to secure the cover to the first side of the base; and
    mate with the second base magnet to secure the cover to the second side of the base.

9. The laptop computer of claim 8, wherein the cover comprises ridges.

10. A laptop computer comprising:
    a base comprising a keyboard on a first side of the base, the keyboard comprising depressible keys;
    a lid hingedly attached to a first end of the base, the lid comprising a display on a first side of the lid, the hinged attachment of the lid to the base enabling the lid to rotate from a first lid position in which the display faces the keyboard to a second lid position in which a second side of the lid, opposite from the first side of the lid, faces a second side of the base, the second side of the base being opposite from the first side of the base; and a cover hingedly attached to a second end of the base, opposite from the first end of the base, the cover comprising a single sheet of polycarbonate surrounded by fabric, the hinged attachment of the cover to the base enabling the cover to rotate from a first cover position, in which a first side of the cover faces the keyboard, to a second cover position in which a second side of the cover, opposite from the first side of the cover, faces the second side of the base.

11. The laptop computer of claim 10, wherein the cover comprises at least one cover magnet configured to secure the cover in the first cover position and to secure the cover in the second cover position.

12. The laptop computer of claim 11, wherein:
the base comprises at least one base magnet configured to secure the cover in the first position; and
the lid comprises at least one lid magnet configured to secure the cover in the second position.

13. The laptop computer of claim 10, wherein the cover comprises ridges.

14. The laptop computer of claim 10, wherein the cover comprises a privacy screen.

15. The laptop computer of claim 10, wherein the hinged attachment of the cover to the base comprises at least a first magnet at an end portion of the cover and a second magnet at an end portion of the base, the end portion of the base being opposite from the hinged attachment of the lid to the base.

\* \* \* \* \*